(12) United States Patent
Paffrath et al.

(10) Patent No.: US 6,334,436 B1
(45) Date of Patent: Jan. 1, 2002

(54) SECONDARY AIR SYSTEM FOR AN INTERNAL COMBUSTION ENGINE

(75) Inventors: Holger Paffrath, Pulheim; Olaf Weber, Friolzheim, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/677,782

(22) Filed: Oct. 2, 2000

(30) Foreign Application Priority Data

Oct. 1, 1999 (DE) .............................................. 199 47 498

(51) Int. Cl.[7] .................................................. F02B 33/00
(52) U.S. Cl. ...................... 123/563; 123/564; 123/559.1; 60/280; 60/307; 60/290; 60/599; 73/116
(58) Field of Search ..................................... 123/563, 564, 123/559.1; 60/289, 280, 307, 599, 607, 606, 290; 73/116

(56) References Cited

U.S. PATENT DOCUMENTS

| 4,091,620 A | * | 5/1978 | Dorsch | 60/606 |
| 4,463,554 A | * | 8/1984 | Sudbeck et al. | 60/307 |
| 4,561,253 A | * | 12/1985 | Curtil | 60/606 |
| 4,674,283 A | * | 6/1987 | Ishida et al. | 60/606 |
| 5,205,120 A | * | 4/1993 | Oblander et al. | 60/307 |
| 5,259,196 A | * | 11/1993 | Faulkner et al. | 123/563 |
| 5,706,790 A | * | 1/1998 | Kemmler et al. | 123/564 |
| 6,158,217 A | * | 12/2000 | Wang | 60/599 |

FOREIGN PATENT DOCUMENTS

| DE | 42 19 267 A1 | * | 12/1993 | 73/116 |
| JP | 359188029 A | * | 10/1984 | 123/559.1 |

* cited by examiner

Primary Examiner—Thomas Denion
(74) Attorney, Agent, or Firm—Crowell & Moring LLP

(57) ABSTRACT

A secondary air system 10 is proposed for an internal combustion engine, which has a turbine 11 driven by a pressure gradient in the intake air and a compressor 14 driven by the turbine 11. The turbine is connected by a turbine inlet line 12 and a turbine outlet line 13 to an air intake duct 20. The compressor 14 has a compressor inlet line 15 and a compressor outlet line 16. The cold produced by the turbine 11 is used by a turbine heat exchanger 17 and transport lines 27 for the cooling of, e.g., oil. The heat produced by the compressor 14 is used by a compressor heat exchanger 18 and the transport lines 27 connected thereto, e.g., for heating air.

20 Claims, 3 Drawing Sheets

SECONDARY AIR SYSTEM FOR AN INTERNAL COMBUSTION ENGINE

BACKGROUND OF THE INVENTION

The invention relates to a secondary air system for an internal combustion engine which recovers energy from the pressure drop in the primary air intake system and which is adapted to utilize thermal energy generated by the secondary air system.

A secondary air system for an internal combustion engine is disclosed in WO 97/38212, and is driven by the pressure difference present in the air intake system. For this purpose a duct branches off ahead of a throttle valve and runs to a turbine which is connected to an outlet line. This outlet line is connected back to the intake system, so that the system is closed. The position of the throttle valve depends on the state of the internal combustion engine. At full load the throttle valve is opened all the way and thus produces no pressure difference. In this state the turbine operates weakly. As soon as the throttle valve is slightly closed a pressure difference is produced by which the turbine is driven. The energy of the turbine serves to operate a compressor. This compressor has an inlet line and an outlet line The inlet line can be connected behind the air filter to the intake system, so that the compressor receives cleaned air and thus is not contaminated. The outlet line from the compressor is connected to the exhaust gas system so that clean air is admixed with the exhaust gas and thus an increased oxidation of hydrocarbons and carbon monoxide present in the exhaust gas is achieved.

Of course, the introduction of clean air into the exhaust system is needed only in the cold starting phase, until the catalyst is heated to the working temperature. After the cold starting phase the known secondary air systems shut down. The introduction of the clean air produces an afterburning of the incompletely burned fuel, which results in an additional heating of the catalyst. This takes place in the cold starting phase of the internal combustion engine. When an internal combustion engine that is at its working temperature the introduction of clean air into the exhaust system can be dispensed with.

It is furthermore known that the air on the outlet end of the turbine expands, so that it cools greatly. This cooling can result in condensation and icing. At the outlet end of the compressor the air is heated. This heat is produced by the compression of the air.

In the known secondary air system the thermal energy of the turbine and compressor, however, is discharged unused into the engine compartment. To prevent condensation or icing, the turbine can be shut off if no energy is needed for the compressor. Then, however, the pressure difference produced by the throttle valve is not utilized and thus constitutes a loss of the energy of the system.

SUMMARY OF THE INVENTION

The object of the invention is therefore to provide an improved air system which can recover and usefully utilize the pressure drop in the air intake duct.

Another object of the invention is to provide an improved air system which can effectively utilize thermal energy generated in the system.

These and other objects of the invention are achieved by providing a secondary air system for an internal combustion engine, said secondary air system comprising a turbine driven by a pressure drop in an intake air duct of said internal combustion engine, said turbine having a turbine inlet duct and a turbine outlet duct each connected to said air intake duct of the internal combustion engine, a compressor driven by said turbine, said compressor having a compressor inlet line and a compressor outlet line, and means for utilizing temperature differences occurring in the secondary air system.

In accordance with a preferred aspect of the invention, the objects are achieved by providing an air intake system for an internal combustion engine comprising an air inlet, an air intake line leading from said inlet to an intake manifold of the internal combustion engine, said air intake line including a duct passage in which a pressure drop occurs in the intake line, a turbine inlet duct connected with the intake line between the air inlet and said duct passage, a turbine which receives air from said turbine inlet duct, a turbine outlet duct leading from a turbine outlet to the intake line between said duct passage and the intake manifold of the internal combustion engine, and a heat exchanger disposed on the turbine outlet line.

In accordance with yet another preferred aspect of the invention, the objects are achieved by providing an air intake system for an internal combustion engine comprising an air inlet, an air intake line leading from said air inlet to an intake manifold of the internal combustion engine, said air intake line including a duct passage in which a pressure drop occurs in the intake line, a turbine inlet duct connected with the intake line between the air inlet and said duct passage, a turbine which receives air from said turbine inlet duct, a turbine outlet duct leading from a turbine outlet to the intake line between said duct passage and the intake manifold of the internal combustion engine, a compressor driven by the turbine, a compressor inlet line connected with the intake line between the air inlet and the duct passage, a compressor outlet line, and a heat exchanger disposed on the compressor outlet line.

The secondary air system for an internal combustion engine according to the invention is advantageously useable for utilizing temperature differences produced in the secondary air system.

For this purpose the secondary air system has a turbine which is connected by a line into the turbine and a line out of the turbine to an air intake system of the internal combustion engine. The line into the turbine is disposed ahead of a throttle valve and the line out of the turbine behind it, so that a pressure difference is produced depending on the throttle valve. This pressure difference is used to drive the turbine. After the turbine, the air expands, so that it cools greatly. By this cooling a refrigerating power of about 0.5 to 2 kW can be achieved. The maximum power of the turbine is reached with the throttle valve closed, since then the greatest pressure difference of about 700 mbar prevails. A choke can be provided in the line to or from the turbine to control it.

The turbine is connected to a compressor so that the turbine drives the compressor. The compressor has an inlet line and an outlet. The line into the compressor can be connected to the air intake system of the internal combustion engine, in which case the air can be taken ahead of or behind a filter element. Taking it behind the filter element is advantageous, since contamination of the compressor is reduced. When air is taken ahead of the filter element an additional filter can be provided to clean the air. The air is compressed in the compressor so that heat is produced. Depending on the mass flow compressed in the compressor a heat output of about 2 kW can be achieved. In the cold starting phase of the internal combustion engine the compressed air from the compressor can be introduced through the compressor outlet line into the exhaust system for afterburning of unburnt fuel.

To be able to use at various points in a motor vehicle the refrigerating and heating power that develops in the secondary air system, means are provided for using the temperature differences occurring in the secondary air system. These means comprise a unit which takes the refrigerating and heating power from the turbine or compressor outlet lines and carries it in a transport duct to the place of use. The operation of the turbine is not time-limited and can thus produce energy even after a cold starting phase. Various embodiments of the heat transfer means are conceivable. One possibility is to pass a fluid around the turbine or compressor lines. To enable the fluid to move in the transport line, pumps can be provided, especially pumps which are driven by the turbine. This fluid can serve as an energy transport means and remain in a closed circuit of the transport lines or issue from the transport line and form an open circuit, in which case a sufficient supply of fluid must be provided to replace the fluid that issues. This fluid can be, for example, oil, water, air, emulsion or a coolant. Another embodiment of the thermal transfer can be in the form of heat-conducting means such as a copper sheet or strip.

Another possibility for using the refrigerating power at the turbine outlet line is the cooling of the intake air, the cold air being introduced into the intake system directly through the turbine outlet line. It is conceivable that the turbine can be turned on especially to cool the intake air. In this manner a more spontaneous response from partial load to full load and a better acceleration from slow driving is achieved.

It is advantageous for the means for using the temperature differences occurring in the secondary air system to comprise a heat exchanger. This heat exchanger can be arranged on the line from the turbine and/or on the line from the compressor, where it can absorb the refrigerating energy from the turbine outlet or the thermal energy from the compressor outlet. The heat exchanger can operate on the concurrent or countercurrent principle.

Another embodiment of the invention provides a closable branch on the compressor outlet line. This branch can, if desired, be opened after the cold start phase and convey the heated air to areas in which warmed air is needed. Hot air can be blown against components in the motor compartment, such as windshield washing fluid or air filters, to prevent icing in winter.

One advantageous embodiment of the invention has the branch line connected to the passenger compartment. This branch line can be connected to an air guiding system in the vehicle and assist an air heater built into the vehicle. The built-in air heaters do not work until the internal combustion engine has warmed up and radiates heat. In comparison to this air heater the branch line from the compressor can yield heat very quickly to the passenger compartment. To control whether and when heat is delivered to the passenger compartment a temperature sensor or a switch can be arranged in the passenger compartment. Control through the air heater is, of course, also possible.

According to another embodiment of the invention a heat exchanger applied to the compressor outlet line can have a through line for the warm air from the air heater so as to be heated thereby. In this embodiment the air compressed by the compressor can yield its heat through the heat exchanger. In this case a branch can be provided from the compressor outlet line to the heat exchanger, so that the air stream itself can be used for other purposes.

An advantageous embodiment of the invention is the arrangement of the heat exchanger on the turbine outlet which permits the fuel to pass through for cooling, thereby improving the efficiency of the internal combustion engine.

Another variant of the invention provides for passing a medium through the heat exchanger so it can be used for cooling the battery. Air can be used as the medium, which is carried through the transport line to the battery and is passed in the form of a cooling coil, for example, around the battery or is blown against the battery through a nozzle which is disposed on the transport line.

An especially advantageous embodiment of the invention has a heat exchanger on the turbine outlet line through which air can be passed for interior cooling. This interior cooling can serve as a supplement to a built-in air conditioner. The built-in air conditioners do not give their maximum output in partial load operation or hard acceleration. In these states of operation, however, a great difference prevails in the pressure between the areas before and after the throttle valve, by which the turbine is driven and thus produces refrigeration. Thus the heat exchanger with air cooling constitutes a practical supplement to the installed air conditioner, especially in stop-and-go traffic. In motor vehicles without air conditioning, the cold from the turbine can likewise be used for cooling the interior of the vehicle. Then the secondary air system serves as a mini-air conditioner.

In another embodiment of the invention, the heat exchanger applied to the turbine outlet can have a line passing through it for oil, so that the secondary air system serves as an oil cooler. An oil thermostat can be provided to control the oil temperature so that, beginning from a given oil temperature, the oil passes through the heat exchanger on the turbine outlet and thus is cooled.

It is advantageous to configure the secondary air system such that the turbine can be operated independently of the compressor. This can be achieved by coupling the components mechanically to one another, or with a valve which lets the air out before it is compressed. Thus the turbine can produce cold by the pressure difference in the air intake system without producing heat in parallel therewith in the compressor if it is not needed. The compressor, however, can not be operated without the turbine so that only heat would be produced.

These and additional features of preferred embodiments of the invention will be found not only in the claims but also in the description and the drawings, the individual features being applicable individually or jointly in the form of subcombinations in embodiments of the invention and in other fields and may represent advantageous as well as independently patentable embodiments, for which protection is hereby claimed.

BRIEF DESCRIPTION OF THE DRAWINGS

The invention will be described in further detail hereinafter with reference to illustrative preferred embodiments depicted in the accompanying drawings in which.

DETAILED DESCRIPTION OF PREFERRED EMBODIMENTS

Figure 1:
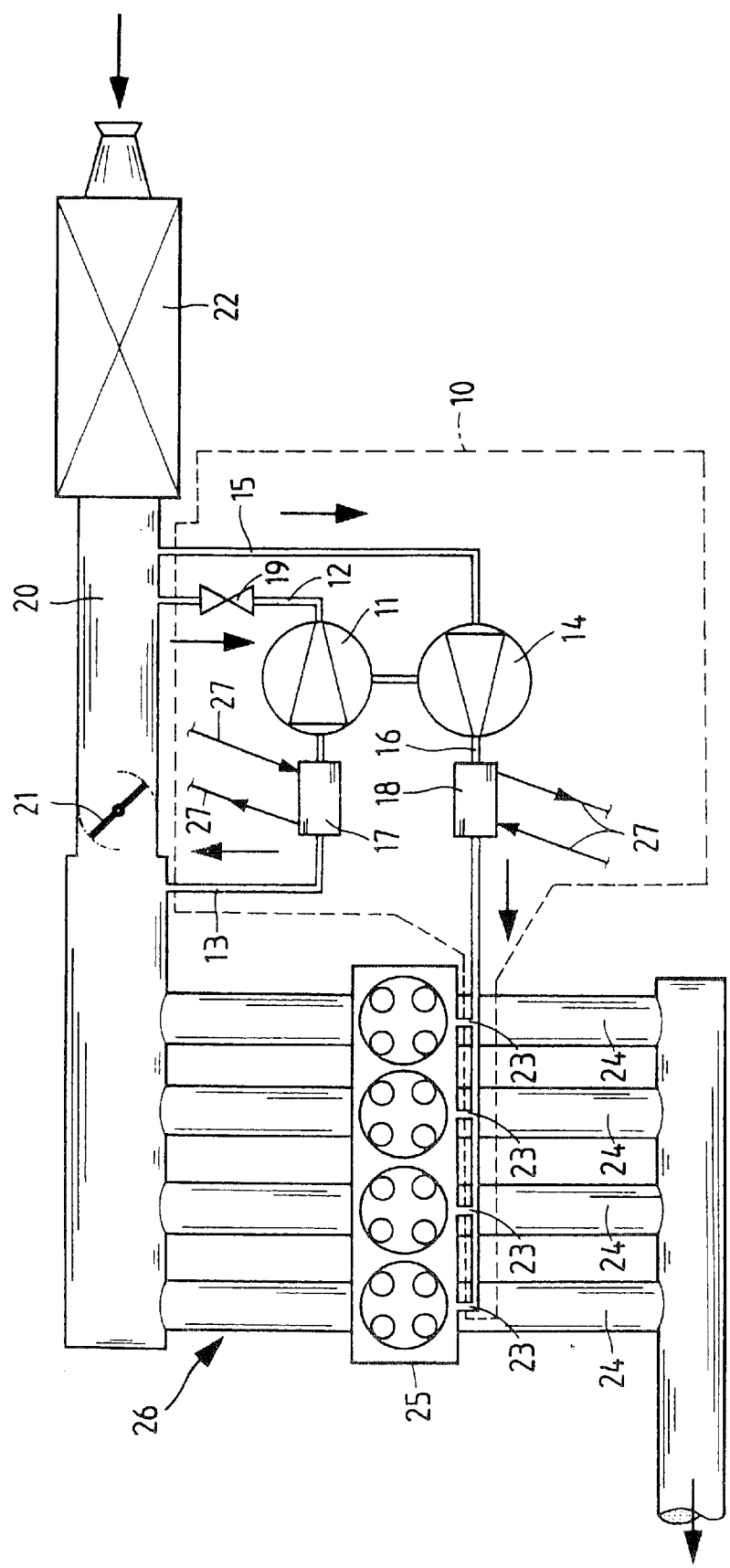
FIG. 1 shows the plan of a secondary air system.

In FIG. 1 a diagram of a secondary air system 10 is shown with the components adjacent thereto. The secondary air system 10 comprises a turbine 11 with a turbine inlet line 12 and a turbine outlet line 13, a compressor 14 with a compressor inlet line 15 and a compressor outlet line 16, a turbine heat exchanger 17 and a compressor heat exchanger 18, as well as a shut-off valve for the turbine 11. The secondary air system 10 is connected to an engine air intake duct or tube 20 by a turbine inlet line 12 arranged ahead of a throttle valve 21 and behind a filter 22. The turbine outlet line 13 is connected to the engine air intake duct 20 behind the throttle valve 21. The compressor inlet line 15 is likewise connected to the engine air intake duct 20 between the filter 22 and the throttle valve 21, so that clean air is fed to the compressor 14. The compressor outlet line 16 leads through nozzles 23 into the exhaust pipes 24 which lead out from an internal combustion engine 25. An air intake manifold 26 is arranged between the air intake duct 20 and the internal combustion engine 25.

When the throttle valve 21 is in the closed position, a pressure difference is produced between the areas before and after the throttle valve 21, by which the turbine is driven when the shut-off valve 19 is opened. If the shutoff valve 19 is closed, the turbine 11 is not driven even in the case of great pressure differences. Therefore the shut-off valve 19 can be used for controlling the operation of the turbine 11. When the shut-off valve 19 is opened and there is a pressure difference in the air intake duct 20, the turbine 11 is driven, causing the air in the turbine outlet line 13 to expand and cool. This cooling energy is absorbed by a coolant in the turbine heat exchanger 17 disposed on the turbine outlet line 13 and transported by transport lines 27, for example, to an engine oil pan in which the oil is to be cooled. However, the medium to be cooled itself, such as fuel or oil, can also be carried by the transport lines 27 and then is cooled directly in the heat exchanger 17. If the cooling energy is needed for cooling the intake air, the heat exchanger can be put into a state in which no cooling energy is removed for other functions.

The compressor heat exchanger 18 is disposed on the compressor outlet line 16, since here the air is heated by the compression. Through the transport lines 27 connected with the compressor heat exchanger 18 air is carried, which is taken from an air duct system of a vehicle 31 (see FIG. 3) and is heated by the compressor heat exchanger 18 and carried back into the air carrying system, so that a vehicle interior 32 can be heated.

Figure 2:
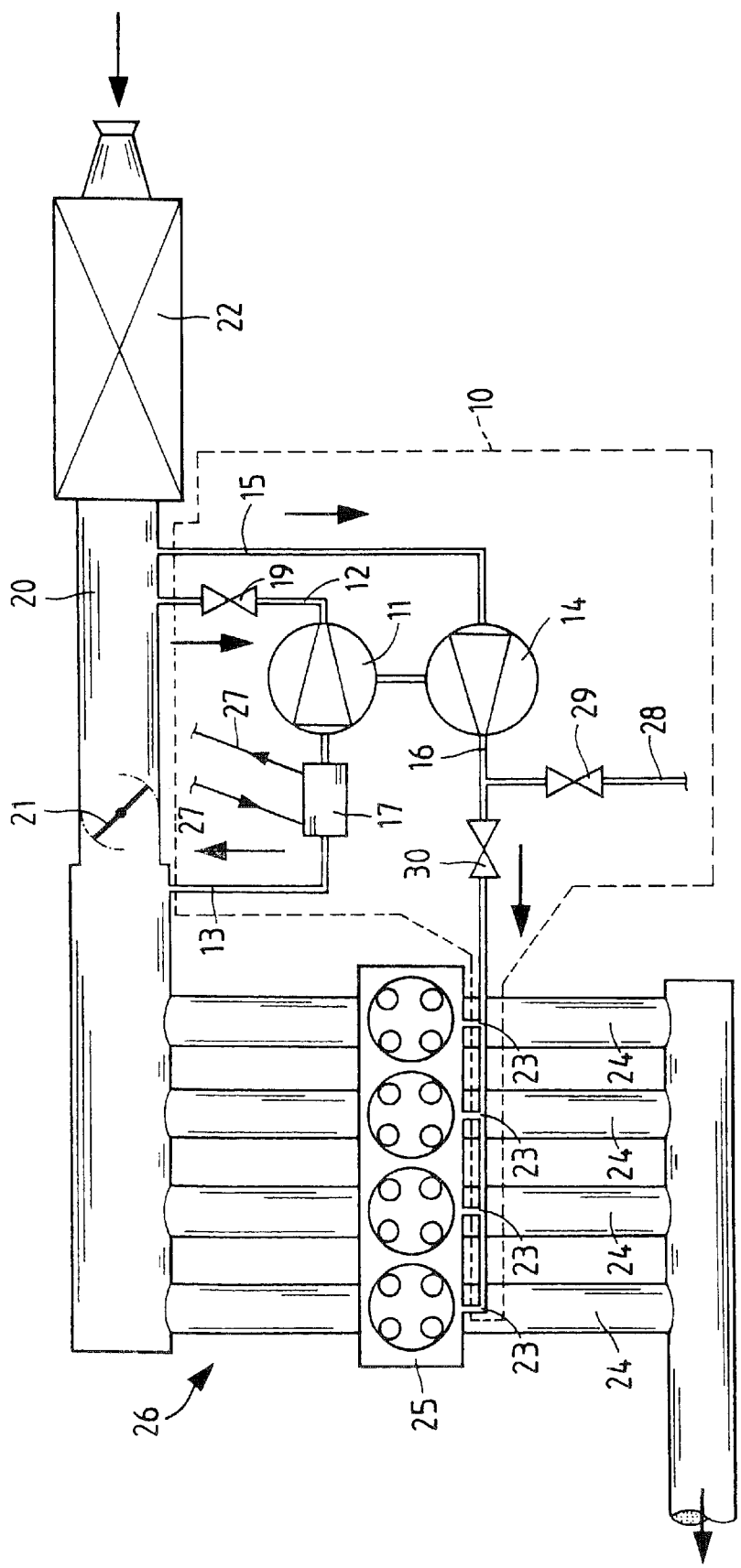
FIG. 2 shows the plan of a variant of a secondary air system.

In FIG. 2 the air system 10 of FIG. 1 is illustrated, in which the compressor outlet line 16 does not have a heat exchanger as in FIG. 1, but has a branch 28 which can be opened or closed by a warm air shut-off valve 29. Furthermore, an exhaust gas inlet shut-off valve 30 is provided which, when closed, directs the air into the branch line 28. This branch line 28 can be connected to a secondary air system of a motor vehicle. The compressor outlet line 16, however, does not necessarily have to be connected to the exhaust pipe 24.

Figure 3:
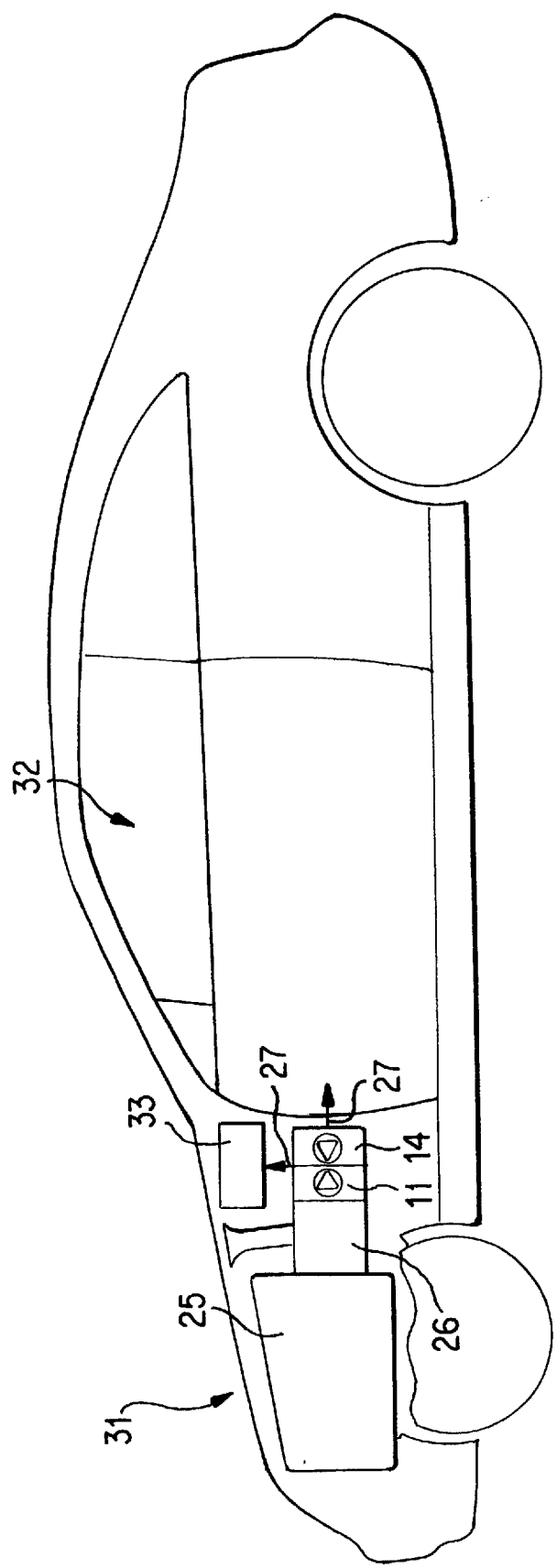
FIG. 3 shows a schematic view of a motor vehicle incorporating the air system of the invention.

FIG. 3 shows a schematic depiction of a motor vehicle 31 with an internal combustion engine 25 and a passenger compartment 32. The engine 25 is provided with an air intake system 26 which supplies air to the cylinders for combusting fuel therein. Air from the air intake system 26 is diverted to drive a turbine 11, which in turn drives a compressor 14. Cooled air from heat exchanger associated with the turbine 11 may be passed through a transport line 27 for further use, for example to cool a battery 33. Similarly, warmed air from a heat exchanger associated with the compressor may be passed through another transport line 27 and used, for example, to heat the passenger compartment 32.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A secondary air system for an internal combustion engine, said secondary air system comprising:
    a turbine driven by a pressure drop in an intake air duct of said internal combustion engine, said turbine having a turbine inlet duct and a turbine outlet duct each connected to said air intake duct of the internal combustion engine;
    a compressor driven by said turbine, said compressor having a compressor inlet line and a compressor outlet line; and
    means for utilizing temperature differences occurring in the secondary air system.

2. The secondary air system according to claim 1, wherein said means for utilizing temperature differences comprises a turbine heat exchanger disposed on the turbine outlet duct.

3. The secondary air system according to claim 2, further comprising a fuel supply line for conveying fuel for said internal combustion engine through said turbine heat exchanger in heat exchange relation with cooled air in said turbine outlet duct to cool the fuel.

4. The secondary air system according to claim 2, further comprising an air line for conveying air through said turbine heat exchanger in heat exchange relation with cooled air in said turbine outlet duct and thence to a battery of said internal combustion engine for cooling said battery.

5. The secondary air system according to claim 2, further comprising a cooling air line for passing air to be cooled through said turbine heat exchanger in heat exchange relation with cooled air in said turbine outlet duct and thence to a vehicle passenger cabin interior for cooling said vehicle passenger cabin.

6. The secondary air system according to claim 2, further comprising an oil feed line for feeding lubricating oil from said internal combustion engine through said turbine heat exchanger in heat exchange relation with cooled air in said turbine outlet duct to cool said lubricating oil.

7. The secondary air system according to claim 1, wherein said means for utilizing temperature differences comprise a closeable branch line connected to said compressor outlet line for diverting warmed compressed air from said compressor outlet line to a vehicle component in need of heating.

8. The secondary air system according to claim 7, wherein said branch line diverts warmed compressed air to vehicle passenger cabin interior.

9. The secondary air system according to claim 1, wherein said means for utilizing temperature differences comprise a compressor heat exchanger disposed on the compressor outlet line.

10. The secondary air system according to claim 9, further comprising an air line for conveying air to be heated through said compressor heat exchanger in heat exchange relation with warmed compressed air in said compressor outlet line.

11. The secondary air system according to claim 1, further comprising a clutch mechanism interposed between said turbine and said compressor for enabling the turbine to be operated independently of the compressor.

12. An air intake system for an internal combustion engine comprising an air inlet, an air intake line leading from said inlet to an intake manifold of the internal combustion engine, said air intake line including a duct passage in which a pressure drop occurs in the intake line, a turbine inlet duct connected with the intake line between the air inlet and said duct passage, a turbine which receives air from said turbine inlet duct, a turbine outlet duct leading from a turbine outlet to the intake line between said duct passage and the intake manifold of the internal combustion engine, and a heat exchanger disposed on the turbine outlet line.

13. The air intake system according to claim 12, further comprising a compressor driven by the turbine, said compressor having an inlet line and an outlet line, said compressor inlet line being connected with the intake line between the air inlet and said duct passage.

14. The air intake system according to claim 13, wherein the compressor outlet line is connected with the exhaust system of the internal combustion engine to form a secondary air system.

15. A motor vehicle having an internal combustion engine with an air intake system according to claim 13, wherein said second compressor outlet line is connected with a vehicle passenger cabin interior.

16. A motor vehicle having an internal combustion engine with an air intake system according to claim 15, wherein fluid passed through said turbine heat exchanger is introduced into a vehicle passenger compartment for cooling the passenger compartment.

17. The motor vehicle having an internal combustion engine with an air intake system according to claim 16, wherein fluid passed through said compressor heat exchanger is passed in heat exchange relation with fuel supplied to the engine to preheat the fuel.

18. The motor vehicle having an internal combustion engine with an air intake system according to claim 15, wherein fluid passed thorough said turbine heat exchanger is conveyed to a battery of the engine for cooling the battery.

19. An air intake system for an internal combustion engine comprising an air inlet, an air intake line leading from said air inlet to an intake manifold of the internal combustion engine, said air intake line including a duct passage in which a pressure drop occurs in the intake line, a turbine inlet duct connected with the intake line between the air inlet and said duct passage, a turbine which receives air from said turbine inlet duct, a turbine outlet duct leading from a turbine outlet to the intake line between said duct passage and the intake manifold of the internal combustion engine, a compressor driven by the turbine, a compressor inlet line connected with the intake line between the air inlet and the duct passage, a compressor outlet line, and a heat exchanger disposed on the compressor outlet line.

20. The air intake system according to claim 19, further comprising a second compressor outlet line with a closeable valve.

* * * * *